United States Patent [19]
Grenier

[11] Patent Number: 5,810,043
[45] Date of Patent: Sep. 22, 1998

[54] AUTOMATIC CHLORINATOR

[75] Inventor: Martin Grenier, Laval, Canada

[73] Assignee: Magi-Eau Inc., Laval, Canada

[21] Appl. No.: 839,454

[22] Filed: Apr. 14, 1997

[51] Int. Cl.$^6$ ..................................................... B01F 1/00
[52] U.S. Cl. .......................................... 137/268; 422/264
[58] Field of Search ............................ 137/268; 422/264, 422/261, 263

[56] References Cited

U.S. PATENT DOCUMENTS

| | | | |
|---|---|---|---|
| 3,240,337 | 3/1966 | Cook | 137/268 X |
| 3,474,817 | 10/1969 | Bates et al. | 137/268 |
| 3,507,624 | 4/1970 | Schneider, Jr. et al. | 137/268 X |
| 3,990,855 | 11/1976 | Cort et al. | 137/268 X |
| 4,199,001 | 4/1980 | Kratz | 137/268 |
| 5,427,748 | 6/1995 | Wiedrich et al. | 137/268 X |

Primary Examiner—Kevin Lee
Attorney, Agent, or Firm—Swabey Olilvy Renault; Guy J. Houle

[57] ABSTRACT

A water chlorinator device for use in a water recirculating conduit system having a water pump connected therein. The chlorinator device comprises a housing having a chlorine-containing chamber vented to atmosphere. A perforated support member is provided for supporting one or more solid chlorine tablets. Projections support a lower one of the tablets elevated from a top surface of said support member. The water supply compartment is provided under the support member and is fed pressurized water from the conduit system downstream of the pump. The water entering the supply compartment exits through orifices formed in the support member whereby to form a turbulent, chlorine dissolving, water cushion above a top support surface of the support member. The water cushion is formed of a plurality of pressurized water jets to dissolve the lower one of the solid chlorine tablets to form chlorine-treated water. An adjustment threaded member is provided for regulating the quantity of pressurized water fed to the compartment under the support member to adjust the water pressure of the pressurized water jets and therefore the dissolving rate of the chlorine. A return conduit communicates the chlorine containing chamber with a chlorine-treated water chamber. A suction line interconnects the chlorine-treated water chamber to the conduit system. A removable cover is provided in a top end of the housing to provide visual access to the top surface of the support member.

12 Claims, 2 Drawing Sheets

AUTOMATIC CHLORINATOR

TECHNICAL FIELD

The present invention relates to a chlorinator for chlorinating water in a water recirculating conduit system and wherein solid chlorine tablets are supported in the chlorinator on a perforated support surface through which a plurality of water jets emanate, the pressure of which is controlled by an adjustable regulating knob to vary the quantity of chlorine dissolved and returned into the recirculating conduit system.

BACKGROUND ART

A multitude of chlorinator devices are known whereby to automatically chlorinate water in a water recirculating conduit system such as utilized to chlorinate the water of swimming pools. A great many of these chlorinators are very complex in construction, do not provide proper chlorine level adjustments, are complicated to operate and require frequent maintenance. They also often release excessive amounts of chlorine into the swimming pool instead of releasing a constant regulated amount and this can cause medical problems to bathers who are in contact with the high chlorinated water discharge. Because the dissolving rate of chlorine powder or tablets contained within some chlorinators is not properly regulated, often the chlorine is dissolved rapidly, causing the above-mentioned problem of over chlorinating. Thereafter no chlorine may be fed to the water for long periods of time and this may result in bacteria growth within the water.

Reference is made to the following U.S. Patents as relating to chlorinators of the type of the present invention. These are U.S. Pat. Nos. 3,710,817; 4,199,001; 5,089,127; 5,441,711; 4,420,394; and 5,419,355.

SUMMARY OF INVENTION

It is a feature of the present invention to provide an automatic chlorinator device which overcomes the disadvantages of prior art chlorinators as mentioned hereinabove.

It is a feature of the present invention to provide an automatic chlorinator device of very simple construction and which utilizes solid chlorine tablets and wherein the dissolving rate of the tablets may be adjustably controlled and the dissolved chlorine released within the circulating water circuit, automatically, and at a regulated rate.

It is another feature of the present invention to provide an automatic chlorinator device wherein large solid chlorine tablets are supported on a perforated support surface above which is formed a turbulent water cushion of pressurized water jets whereby to slowly dissolve a lower one of a stack of chlorine tablets supported thereon.

Another feature of the present invention is to provide an automatic chlorinator device of simple construction, which is easy to use and regulate and which operates automatically by the use of the pressurized water in a swimming pool water recirculation system.

According to the above features, from a broad aspect, the present invention provides a chlorinator device for chlorinating water in a water recirculating conduit system having a water pump connected therein. The chlorinator comprises a housing having a chlorine-containing chamber vented to atmosphere. A perforated support member is provided for supporting one or more solid chlorine tablets. Means is provided for supporting a lower one of a stack of the tablets elevated from a top surface of the support member. A water supply compartment is provided under the support member. Conduit means is provided for feeding pressurized water from the conduit system downstream of the pump to the compartment and through orifices formed in the support member to form a turbulent water cushion above a top support surface of the support member. The water cushion is formed of a plurality of pressurized water jets whereby to slowly dissolve the lower one of the chlorine tablets to form chlorine-treated water. Adjustment means is provided for regulating the quantity of pressurized water fed to the compartment under the support member to adjust the water pressure of the pressurized water jets. Return conduit means communicates the chlorine containing chamber with a chlorine-treated water chamber. A suction line interconnects the chlorine-treated water chamber to the conduit system. Access means provides visual access to the top surface of the support member prior to inserting one or more of the chlorine tablets in stacked relationship thereover.

BRIEF DESCRIPTION OF DRAWINGS

A preferred embodiment of the present invention will now be described with reference to the accompanying drawings in which.

DESCRIPTION OF PREFERRED EMBODIMENTS

Figure 3:
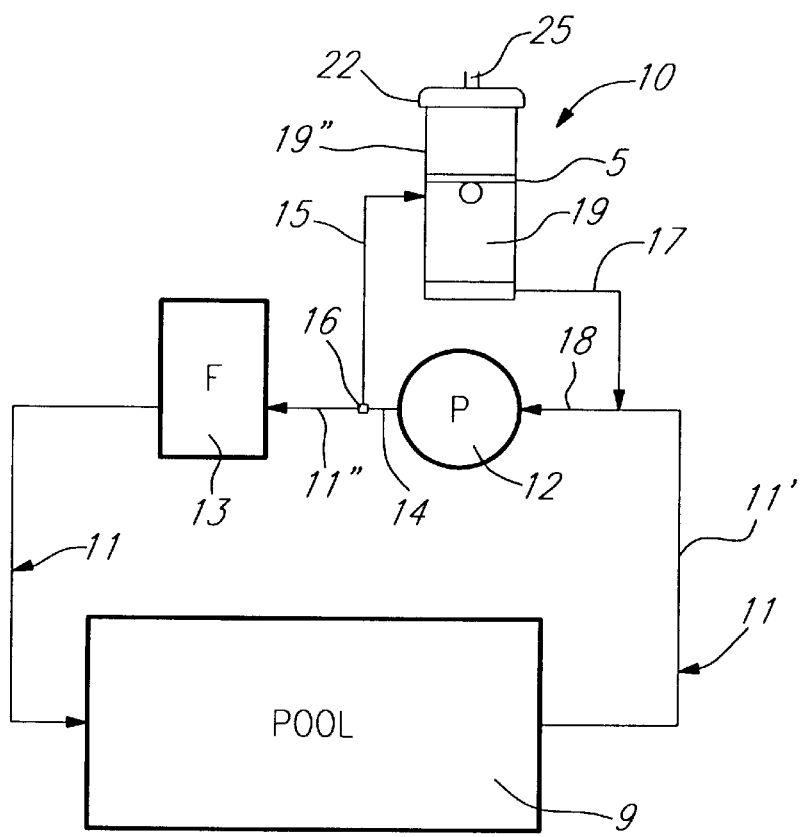
FIG. 3 is a schematic diagram illustrating the connection of the automatic chlorinator device of the present invention in a water recirculating conduit system of a swimming pool.

Referring now to the drawings there is shown generally at 10 the automatic water chlorinator device of the present invention. As shown in FIG. 3, the automatic chlorinator device 10 is connected in a water recirculating conduit system 11 of a swimming pool 12, although the chlorinator device could have use for chlorinating water for other applications than a swimming pool. As hereinshown the recirculating conduit system 11 is comprised of conduits 11' and water is circulated therethrough by a pump 12 and filtered by a filter 13 connected to the conduit 11' at the outlet 14 of the pump 12. The water exiting the filter 13 is fed back into the pool 12 through adjustable return jets (not shown) as is well known in the art. The water exits the pool through a skimmer device or a bottom drain (not shown) as is also well known to a person skilled in the art.

As hereinshown the chlorinator device 10 of the present invention is provided with an inlet conduit 15 which is tapped from a tap connection 16 on the outlet conduit 11" exiting the pump 12. Accordingly, water under pressure enters the automatic chlorinator device 10, under pressure. A return conduit 17 returns chlorine-treated water back into the recirculating conduit 11' through the feed inlet 18 of the pump 12 and into the pool 9, automatically.

With specific reference now to FIGS. 1 and 2, there will be described the construction of the automatic chlorinator device 10 of the present invention. As hereinshown the chlorinator device comprises a housing 19 which defines an upper chlorine-containing chamber 20 in which solid chlorine tablets 21 are stacked. A cover 22 secures the top open end 23 of the upper chamber 20 and is provided with a vent valve 24 and a vent conduit 25 to vent fumes or gas under pressure that may form in the upper chlorine-containing chamber 20. The cover 22 may also be provided with a seeing glass 26 or formed of suitable transparent material to observe if chlorine tablets 21 are present within the upper chamber 20.

At the base of the upper chlorine-containing chamber 20 there is provided a perforated support plate 27 provided with a plurality of holes of predetermined size and which constitutes water jets 28. These are better seen in FIG. 2. The perforated support plate 27 as hereinshown is a circular plate and it is secured to a transverse division wall 8 which is provided with an upper cavity to form a water supply compartment 29 under the support plate 27 and which communicates with the holes 28 which forms the water jets. The perforated support plate 27, as better shown in FIG. 2, is secured to the top edge 30 of the division wall 29 by screw fasteners 31 having arcuately shaped heads 32 which form projections whereby to support the lower one 21' of the solid chlorine tablets 21 elevated from the top surface 27' of the perforated support plate 27. Of course, support fingers may also be molded integral with the top surface of the plate 27.

The inlet conduit 15, as hereinshown, feeds pressurized water from the conduit 11" at the outlet 14 of the pump 12 into the water supply compartment 29 under the perforated support plate 27 and is regulated by an adjustment means constituted by a threaded member 33 provided with an obstructing end 34 which extends into a regulating port 35 through which the inlet conduit 15 and the water supply compartment are interconnected via an intermediate conduit 35'. The adjustment member 33 is also provided with an external finger engaging head 36 to permit rotation thereof and adjustable movement of the position of the obstructing end 34 by axially rotating the threaded member. This finger engaging head 36 protrudes sufficiently outside the side wall 19' of the housing to permit easy finger engagement and it may also be provided with markings, such as shown at 36' in FIG. 2, to coincide with further markings, not shown, provided on the adjacent side wall 19' about the head 36 to indicate, to the user, that the regulating port 35 is fully open or fully closed by the obstructing end 34 of the adjustable member 33.

Figure 1:
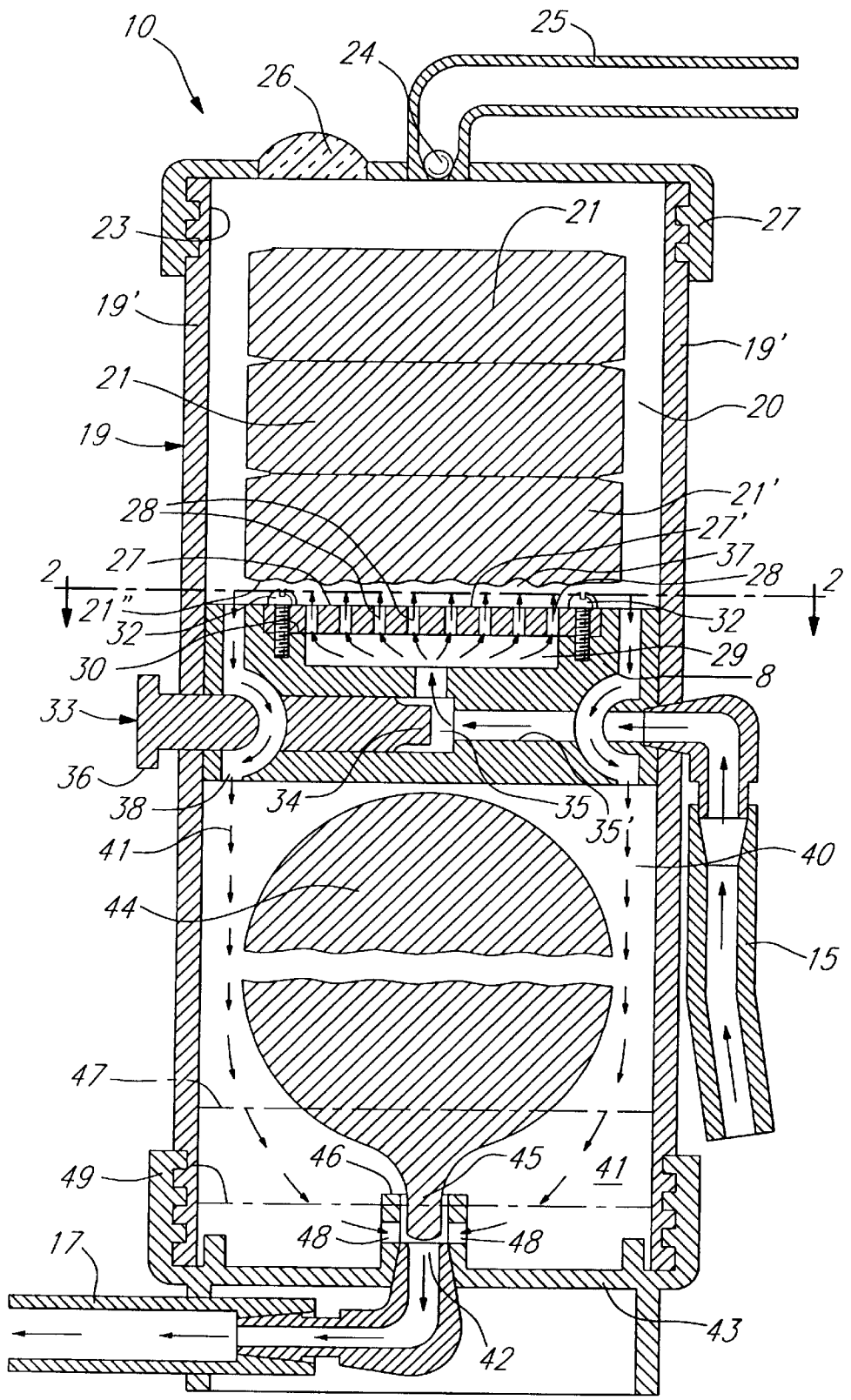
FIG. 1 is a longitudinal section view illustrating the construction of the automatic chlorinator device of the present invention.

Water under pressure enters into the water supply compartment and exits through the holes 28 to form a turbulent water cushion 37 over the top surface 27' of the perforated support plate 27 and this cushion, as shown in FIG. 1, slowly dissolves chlorine from the bottom surface 21" of the lower one 21' of the tablets 21. This forms chlorine-treated water within the upper chamber 20. Therefore, the tablets will dissolve from the bottom of the stack.

Figure 2:
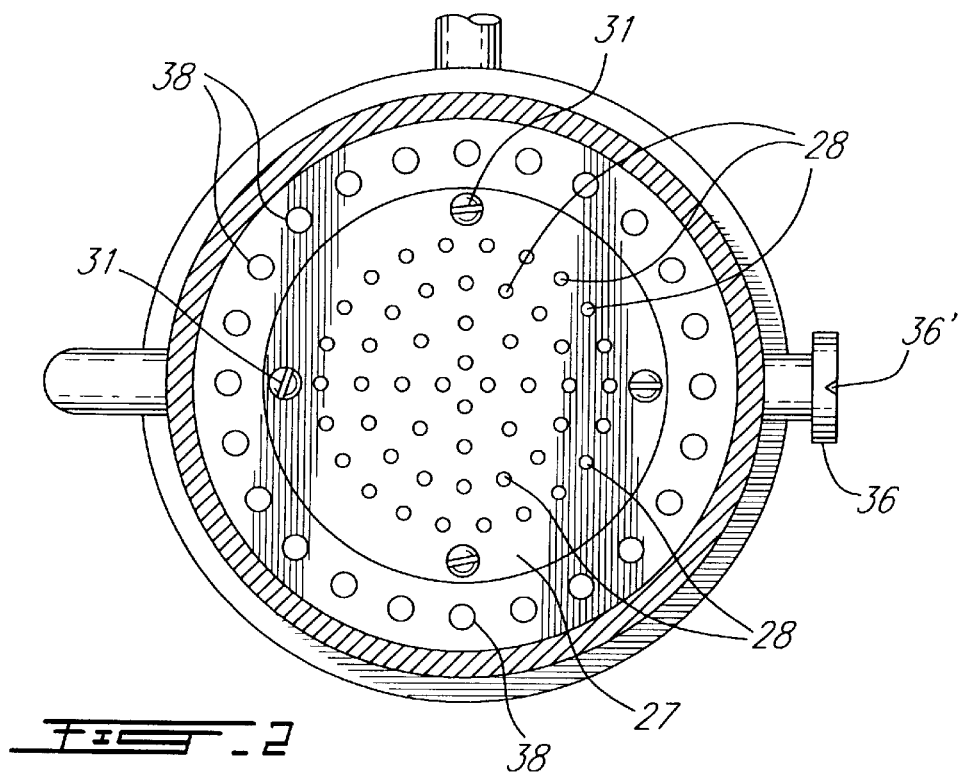
FIG. 2 is a cross-section view along section lines II—II of FIG. 1 illustrating the construction of the perforated support member.

The chlorine-treated water formed within the upper chamber is directed, through gravity, through a plurality of holes 38 provided in the division wall 8 all about the perforated support plate 27, as better shown in FIG. 2. These holes constitute return conduits which communicates the chlorine containing chamber with a chlorine-treated lower water chamber 40.

As shown in FIG. 1, chlorine-treated water, as indicated by arrows 41, falls by gravity into the lower chamber 40 to feed chlorinated water back into the conduit 11' of the recirculating conduit system 11 near the inlet 18 of the pump to chlorinate the water in the system. The return conduit 17 is a suction conduit and the suction is constituted by the water flowing into the recirculating conduit 11'. It sucks water through the outlet port 42 formed in the bottom wall 43 of the lower chamber 40 through a valve which is comprised of a float 44 provided with a plunger 45 held in a valve cylinder 46. As the water within the lower chamber 40 rises to the level, such as identified by reference numeral 47, the float 44 overcomes the suction effect at the outlet port 42 and rises with its plunger 45 clearing the inlet openings 48 to the port 42 causing chlorine-treated water 41 within the lower chamber to be sucked out of the lower chamber by the return conduit 17. The purpose of the float valve is to prevent air from entering the return conduit 17 and directed into the pump 12 where it would unprime the pump. When the water level drops down to a low level, such as level 49, the outlet port 42 is blocked and chlorine-treated water will only be supplied once the level in the lower chamber increases to again open the float valve.

As hereinshown, the housing 19 is formed from an elongated tubular plastic pipe or other material which does not react with chlorinated water. It is also conceivable that the upper-chamber be formed by a separate cylinder section which is removably connected to the lower cylinder section which forms the lower chamber whereby the length of the upper chamber may be adjusted by interchanging threaded tubular sections of different lengths. Accordingly, with a longer length chamber more tablets may be provided therein so that the chlorinator need be refilled at longer intervals of time. Although a seeing glass 26 is provided in the top wall it is obvious that the upper cylinder section of the housing may also be formed of a transparent material, not affected by chlorinated water, and it could also provide better visual access to the tablets within the upper chamber.

It is also pointed out, that because the water pressure in recirculating conduits systems of swimming pools vary depending on the type of pump utilized and its operation, that the pressure entering the water supply compartment 29 will vary from system to system. Accordingly, to adjust the chlorinator of the present invention it is quite easy for the operator to view the water cushion 37 formed on the top surface of the perforated plate through the top open end 23 of the upper chamber with the cover removed. By adjusting the adjustable member 33 the height of this turbulent water cushion can be increased or decreased. Accordingly, regardless of the pressure of the pump, the cushion is adjustable to suit the water pressure of the pump. The chlorine tablets are then loaded on the top surface of the perforated plate and the cover is secured to the top end of the housing 19. If the swimming pool water requires more chlorine the user simply rotates the adjustable member 33 to increase the water pressure in the cushion to dissolve more chlorine until the chlorine in the water is at the desired level. Once at the desired level, the chlorine concentration will vary automatically depending on water temperature. The hotter the water, the more chlorine is dissolved. The cooler the water, the less chlorine is dissolved.

As shown in FIG. 3, a collar 5 may be provided to secure interchangeable upper housing sections 19" to the lower housing section 19. Also, as shown in FIG. 1, copper electrodes 50 may be secured inside the lower chamber 40 by screws 51 to which a small d.c. supply of about 5 volts can be connected whereby to generate ions in the chlorinated water. The copper ions generated enhance the disinfecting action of the chlorinated water to prevent the formation of alga.

Other obvious modifications of the present invention are contemplated and intended to be covered by the present invention, provided they fall within the scope of the appended claims.

I claim:

1. A chlorinator device for chlorinating water in a water recirculating conduit system having a water pump connected therein, said chlorinator comprising a housing having a chlorine-containing chamber vented to atmosphere, a perforated support member for supporting one or more solid chlorine tablets, means for supporting a lower one of a stack of said tablets elevated from a top surface of said support member, a water supply compartment under said support member, inlet conduit means for feeding pressurized water from said conduit system downstream of said pump to said compartment and through orifices formed in said support member to form a turbulent water cushion above a top support surface of said support member, said water cushion being formed of a plurality of pressurized water jets to slowly dissolve said lower one of said solid chlorine tablets to form chlorine-treated water, adjustment means for regulating the quantity of pressurized water fed to said compartment under said support member to adjust the water pressure of said pressurized water jets, return conduit means communicating said chlorine containing chamber with a chlorine-treated water chamber, a suction line interconnecting said chlorine-treated water chamber to said conduit system, access means to provide visual access to said top surface of said support member prior to inserting one or more of said chlorine tablets in stacked relationship thereover, valve means interconnecting said chlorine-treated water chamber with said suction line to prevent admission of air with said chlorine-treated water flowing to said suction line, and an intermediate conduit formed in a wall under said water supply compartment and communicating said conduit means to said water supply compartment, said adjustment means being a threaded member having a finger engaging head disposed externally of said housing, said threaded member having a passage obstructing end communicating with said intermediate conduit to adjust the cross-sectional area of said intermediate conduit adjacent said passage obstructing end to vary the quantity of pressurized water fed to said water supply compartment and thereby vary the pressure of said water lets forming said water cushion to adjust the dissolving rate of a lower one of a stack of said solid chlorine tablets.

2. A chlorinator device as claimed in claim 1 wherein said conduit means is a water line tapped in said conduit system downstream of said water pump.

3. A chlorinator device as claimed in claim 2 wherein said suction line is connected to said conduit system upstream of said water pump.

4. A chlorinator device as claimed in claim 1 wherein said chlorine-treated water chamber is located under said chlorine-containing chamber, said return conduit means being comprised by a plurality of holes formed in a division wall between said chambers to cause said chlorine-treated water to gravitate from said chlorine-containing chamber to said chlorine-treated water chamber.

5. A chlorinator device as claimed in claim 4 wherein said valve means is a float valve having a float and a plunger secured thereto, said plunger being held in a valve port having orifices for the passage of chlorine-treated water to said suction line, said plunger being displaceable in said port by said float to position said plunger in an orifice obstructing position when water level in said chlorine-treated water chamber is at or below a low water level, to a non-obstructing position when said chlorine-treated water is above said low water level.

6. A chlorinator device as claimed in claim 1 wherein said chlorine-containing chamber is formed in a top portion of a cylindrical housing, said access means being a cover removably connected to a top opening of said cylindrical housing to position solid chlorine tablets therein and to permit said visual access to said top surface of said support member, and a vent in said cover provided with valve means to exhaust gases formed in said chlorine-containing chamber.

7. A chlorinator device as claimed in claim 6 wherein said cylindrical housing has a replaceable top cylindrical section to interconnect top cylindrical sections of different lengths to accommodate larger quantities of chlorine tablets therein, said chlorine tablets being large solid chlorine discs.

8. A chlorinator device as claimed in claim 1 wherein said water recirculating conduit system is connected to a swimming pool, there being a water filter connected to said conduit system downstream of said pump, said chlorinator being connected to said conduit system across said pump with said conduit means downstream of said pump and said suction line upstream of said pump.

9. A chlorinator device as claimed in claim 1 wherein said adjustment means is a threaded member having a passage obstructing end extending in a regulating port interconnecting said conduit means to said water supply compartment.

10. A chlorinator device as claimed in claim 9 wherein said threaded member has a finger engaging head protruding from a side wall of said housing for axial rotation of said threaded element.

11. A chlorinator device for chlorinating water in a water recirculating conduit system having a water pump connected therein, said chlorinator comprising a housing having a chlorine-containing chamber vented to atmosphere, a perforated support member for supporting one or more solid chlorine tablets, means for supporting a lower one of a stack of said tablets elevated from a top surface of said support member, a water supply compartment under said support member, inlet conduit means for feeding pressurized water from said conduit system downstream of said pump to said compartment and through orifices formed in said support member to form a turbulent water cushion above a top support surface of said support member, said water cushion being formed of a plurality of pressurized water jets to slowly dissolve said lower one of said solid chlorine tablets to form chlorine-treated water, adjustment means for regulating the quantity of pressurized water fed to said compartment under said support member to adjust the water pressure of said pressurized water jets, return conduit means communicating said chlorine containing chamber with a chlorine-treated water chamber, a suction line interconnecting said chlorine-treated water chamber to said conduit system, access means to provide visual access to said top surface of said support member prior to inserting one or more of said chlorine tablets in stacked relationship thereover, said means for supporting a lower one of said tablets elevated from said top surface of said support member being projections disposed about said support member, said projections being fastener heads projecting above said top surface, said support member being a circular perforated plate secured by fasteners located adjacent a circumferential edge therefrom.

12. A chlorinator device as claimed in claim 11 wherein said perforated plate is secured over a cavity formed in a division wall disposed across said cylindrical housing, said cavity constituting said water supply compartment, said chlorine tablets being large solid chlorine discs dimensioned to at least span said circular perforated plate to be supported by said fastener heads whereby said pressurized water cushion will dissolve said tablet from an underface thereof, said chlorine-containing chamber being of sufficient length to contain two or more of said discs stacked one on top of another.

* * * * *